(12) United States Patent
Morizono et al.

(10) Patent No.: US 10,454,699 B2
(45) Date of Patent: Oct. 22, 2019

(54) HUB APPARATUS AND CONTROL SYSTEM

(71) Applicant: NEC Corporation, Minato-ku, Tokyo (JP)

(72) Inventors: Jun Morizono, Tokyo (JP); Ichiro Hirai, Kanagawa (JP); Kazuhiro Kawamoto, Kanagawa (JP); Shinichiro Iwata, Tokyo (JP); Tsuyoshi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 175 days.

(21) Appl. No.: 15/521,659

(22) PCT Filed: Nov. 5, 2015

(86) PCT No.: PCT/JP2015/081137
§ 371 (c)(1),
(2) Date: Apr. 25, 2017

(87) PCT Pub. No.: WO2016/072445
PCT Pub. Date: May 12, 2016

(65) Prior Publication Data
US 2017/0250833 A1    Aug. 31, 2017

(30) Foreign Application Priority Data

Nov. 5, 2014    (JP) .................................. 2014-225081

(51) Int. Cl.
*H04L 12/28*    (2006.01)
*G05B 15/02*    (2006.01)
(Continued)

(52) U.S. Cl.
CPC .............. *H04L 12/28* (2013.01); *B60L 53/00* (2019.02); *G05B 15/02* (2013.01); *H02J 7/0042* (2013.01);
(Continued)

(58) Field of Classification Search
CPC ................ B60L 11/1809; G05B 15/02; G05B 2219/2642; H02J 7/0042; H04L 12/28
See application file for complete search history.

(56) References Cited

U.S. PATENT DOCUMENTS 4,674,085 A    6/1987    Aranguren et al.
5,546,378 A    8/1996    Wirth et al.
(Continued)

FOREIGN PATENT DOCUMENTS

JP    S61-219247 A    9/1986
JP    H03-210849 A    9/1991
(Continued)

OTHER PUBLICATIONS

Japanese Office Action for JP Application No. 2014-225081, dated Jul. 31, 2018 with English Translation.
(Continued)

*Primary Examiner* — Kashif Siddiqui

(57) ABSTRACT

A hub apparatus comprises a first port that receives predetermined cascade-supplied differential signals; a plurality of second ports that receive and output the predetermined differential signals; a third port that cascade-outputs the predetermined differential signals; a plurality of differential signal line pairs that daisy-chain connect the first port, the plurality of second ports, and the third port in this order from upstream to downstream; and a terminator provided between two differential signal lines that constitute a differential signal line pair connecting the last-stage second port out of the plurality of second ports to the third port.

12 Claims, 9 Drawing Sheets

(51) Int. Cl.
*H02J 7/00* (2006.01)
*B60L 53/00* (2019.01)

(52) U.S. Cl.
CPC ... *G05B 2219/2642* (2013.01); *Y02T 10/7005* (2013.01)

(56) References Cited

U.S. PATENT DOCUMENTS

| | | | | |
|---|---|---|---|---|
| 6,076,117 | A * | 6/2000 | Billings | H04L 12/44 709/249 |
| 6,601,109 | B1 * | 7/2003 | Bealkowski | H04L 12/44 709/238 |
| 6,822,972 | B1 * | 11/2004 | Farhan | H04B 10/275 348/E7.07 |
| 2003/0041161 | A1 * | 2/2003 | Billings | H04L 12/44 709/231 |
| 2004/0239374 | A1 * | 12/2004 | Hori | H03K 5/003 327/65 |
| 2010/0061396 | A1 | 3/2010 | Andersson | |
| 2010/0135151 | A1 | 6/2010 | Johnson et al. | |
| 2011/0134792 | A1 * | 6/2011 | Andersson | H04L 12/2838 370/254 |

FOREIGN PATENT DOCUMENTS

| | | |
|---|---|---|
| JP | H03-268535 A | 11/1991 |
| JP | H08-111680 A | 4/1996 |
| JP | 2002-368771 A | 12/2002 |
| JP | 2004-178081 A | 6/2004 |
| JP | 2006-135950 | 5/2006 |
| JP | 2007-149344 A | 6/2007 |
| JP | 2010-028670 A | 2/2010 |
| JP | 2010-534446 A | 11/2010 |
| WO | 2011/055607 A1 | 5/2011 |

OTHER PUBLICATIONS

International Search Report for PCT Application No. PCT/JP2015/081137, dated Jan. 12, 2016.
Extended European Search Report for EP Application No. 15857839.3, dated May 16, 2018.
Japanese Office Action for JP Application No. 2014-225081, dated Nov. 20, 2018 with English Translation.

* cited by examiner

HUB APPARATUS AND CONTROL SYSTEM

This application is a National Stage Entry of PCT/JP2015/081137 filed on Nov. 5, 2015, which claims priority from Japanese Patent Application 2014-225081 filed on Nov. 5, 2014, the contents of all of which are incorporated herein by reference, in their entirety.

DESCRIPTION OF RELATED APPLICATION

The present invention is based upon and claims the benefit of the priority of Japanese patent application No. 2014-225081 filed on Nov. 5, 2014, the disclosure of which is incorporated herein in its entirety by reference thereto.

FIELD

The present invention relates to a hub apparatus and control system, and particularly to a hub apparatus for connecting a controller such as a charge controller that controls a plurality of chargers or a home appliances controller that controls a plurality of home appliances to the plurality of chargers and the plurality of home appliances, and a control system comprising such a hub apparatus.

BACKGROUND

As part of measures against global warming, electric vehicles (EV) and plug-in hybrid vehicles (PHV) having excellent carbon dioxide emissions performance attract increasing attention. Since EVs and PHVs require charging, it is necessary to provide charging facilities when these vehicles are implemented.

FIG. 9 is a drawing illustrating a configuration example of charging facilities comprising chargers 1A to 1E. In FIG. 9, the charging facilities comprise the plurality of chargers 1A to 1E (five chargers in FIG. 9), a charge controller 2, a distribution board 3, a signal cable 4, and a plurality of power cables 5 (five cables in FIG. 9). The chargers 1A to 1E charge an EV or PHV. The charge controller 2 accepts a user's operation, controls the chargers 1A to 1E according to the operation of the user, and provides a means of payment to the user. The distribution board 3 supplies power to each of the chargers 1A to 1E. The signal cable 4 connects the charge controller 2 and the chargers 1A to 1E in a daisy-chain arrangement, and relays a control signal transmitted by the charge controller 2 (for instance a signal compliant with RS (Recommended Standard)-485) to the chargers 1A to 1E. The plurality of power cables 5 connect the distribution board 3 to the corresponding chargers 1A to 1E.

The charge controller 2 is further connected to a server group 8 constituted by various servers via a LAN (Local Area Network), a router 6, and a carrier network 7. For instance, the server group 8 includes an electronic money server and a management server for the administrator of the charging facilities. The charge controller 2 provides a means of payment by electronic money to the user by communicating with the electronic money server. Further, a company that administers the charging facilities remotely operates and manages the charging facilities by operating the charge controller 2 via the management server.

Further, in recent years, home appliances (for instance air conditioner, television, lighting apparatus, rice cooker, microwave oven, water heater, wash machine, etc.) utilizing information and communication technologies (ICT) have appeared, and technologies that uniformly control these home appliances using a home appliances controller have gained attention.

As a related technology, Patent Literature 1 discloses a technology that enables a star wiring connection in an SCSI (Small Computer System Interface) system.

Further, Patent Literature 2 discloses a technology that increases the flexibility of wiring connecting a host controller to a plurality of encoders and that enables a daisy-chain connection without connecting a terminator at the end by providing a built-in terminator in the encoders.

[Patent Literature 1]
Japanese Patent Kokai Publication No. JP-A-H08-111680
[Patent Literature 2]
Japanese Patent Kokai Publication No. JP-P2004-178081A

SUMMARY

The disclosure of each Patent Literature cited above is incorporated herein in its entirety by reference thereto. The following analysis is given by the present inventors.

In FIG. 9, the chargers 1A to 1E and the charge controller 2 are daisy-chain connected by the signal cable 4. The changers 1A to 1E and the distribution board 3, however, are star-connected by the plurality of power cables 5. Therefore, in the configuration of FIG. 9, in addition to the complicated wiring of the signal cable 4 and the power cables 5, spaces for routing these cables must be secured separately. In order to solve this problem, it is desirable that the power cables providing power from the distribution board 3 to the chargers 1A to 1E and the signal cable providing the control signal from the charge controller 2 to the chargers 1 have a common connection topology.

Further, when a differential transmission path compliant with RS (Recommended Standard)-485 is used as the signal cable 4 that relays the control signal from the charge controller 2 to the chargers 1A to 1E, a terminator must be provided at the end of the signal cable 4. For instance, in the charging facilities shown in FIG. 9, it is necessary to provide a built-in terminator in each of the chargers 1A to 1E, or connect an external terminator to the charger 1E at the end of the daisy-chain connection.

When a built-in terminator is provided in each of the chargers 1A to 1E, however, the terminators in the chargers 1A to 1D connected in the middle of the daisy-chain connection must be turned off while the terminator in the charger 1E at the end of the connection must be on, resulting in a cumbersome setting operation. Further, in this case, the manufacturing cost of the chargers 1A to 1E increases. On the other hand, connecting an external terminator to the charger 1E at the end of the daisy-chain connection will also be cumbersome work.

Similar problems occur when a home appliances controller controls a plurality of home appliances. In other words, when the home appliances controller and the plurality of home appliances are daisy-chain connected using a differential transmission path, it is necessary to provide a built-in terminator in a home appliance connected at the end of the daisy-chain connection, or externally connect a terminator to the home appliance at the end of the connection. Further, unlike the case of the charging facilities where a professional engineer configures the terminator, it may be difficult for a user without expertise to properly configure the terminator for home appliances.

Further, in the charging facilities shown in FIG. 9, if one of the daisy-chain connected chargers 1A to 1E is removed, the connection configuration of the signal cable 4 will have to be changed so that the chargers before and after the removed charger are directly connected to each other. For instance, if the charger 1B be removed in the configuration illustrated in FIG. 9, the connection of the signal cable 4 will have to be changed so as to directly connect the chargers 1A and 1C with the signal cable 4. This work of connecting the signal cable 4 will be cumbersome.

Further, while the technologies described in Patent Literatures 1 and 2 make it possible to increase the flexibility of signal cable wiring, it is necessary to provide built-in terminators in the daisy-chain connected devices, or connect an external terminator to the device at the end of the daisy-chain connection. As a result, in the technologies described in Patent Literatures 1 and 2, the operation of setting the terminators is cumbersome and the manufacturing cost of the devices increases due to the built-in terminators therein.

Therefore, it is a challenge to increase the flexibility of wiring and facilitate the setting of a terminator when a controller and a plurality of devices are daisy-chain connected. It is an object of the present invention to provide a hub apparatus and control system that contribute to solving this challenge.

A hub apparatus relating to a first aspect of the present invention comprises a first port that receives predetermined cascade-supplied differential signals; a plurality of second ports that receive and output the predetermined differential signals; a third port that cascade-outputs the predetermined differential signals; a plurality of differential signal line pairs that daisy-chain connect the first port, the plurality of second ports, and the third port in this order from upstream to downstream; and a terminator provided between two differential signal lines that constitute a differential signal line pair connecting the last-stage second port out of the plurality of second ports to the third port.

A control system relating to a second aspect of the present invention comprises a first hub apparatus, and a second hub apparatus cascade-connected to the first hub apparatus. The first and the second hub apparatuses comprise a first port that receives predetermined cascade-supplied differential signals; a plurality of second ports that receive and output the predetermined differential signals; a third port that cascade-outputs the predetermined differential signals; a plurality of differential signal line pairs that daisy-chain connect the first port, the plurality of second ports, and the third port in this order from upstream to downstream; a terminator provided between two differential signal lines that constitute a differential signal line pair connecting the last-stage second port out of the plurality of second ports to the third port; and a first switch that connects and disconnects between one of the two differential signal lines and the terminator. The first port of the second hub apparatus receives the predetermined differential signals outputted from the third port of the first hub apparatus.

The meritorious effects of the present invention are summarized as follows. According to the hub apparatus and the control system relating to the present invention, it becomes possible to increase the flexibility of wiring and facilitate the setting of a terminator when a controller and a plurality of devices are daisy-chain connected.

PREFERRED MODES

Figure 1:
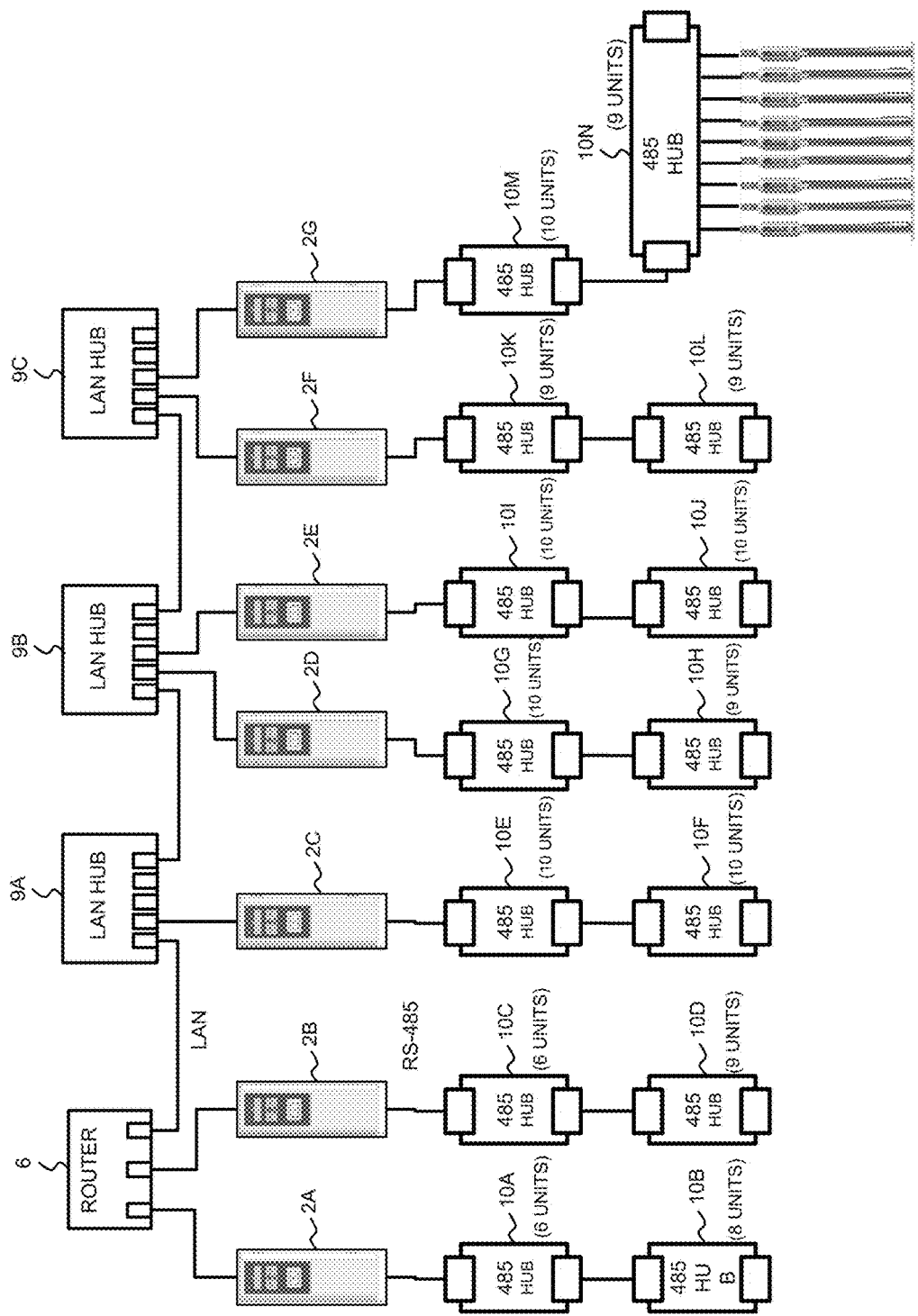
FIG. 1 is a drawing illustrating the configuration of a control system relating to a first example embodiment.

First, a summary of an example embodiment will be given. It should be noted that drawing reference signs in the summary are given solely to facilitate understanding and are not intended to limit the present invention to the modes shown in the drawings.

Figure 4:
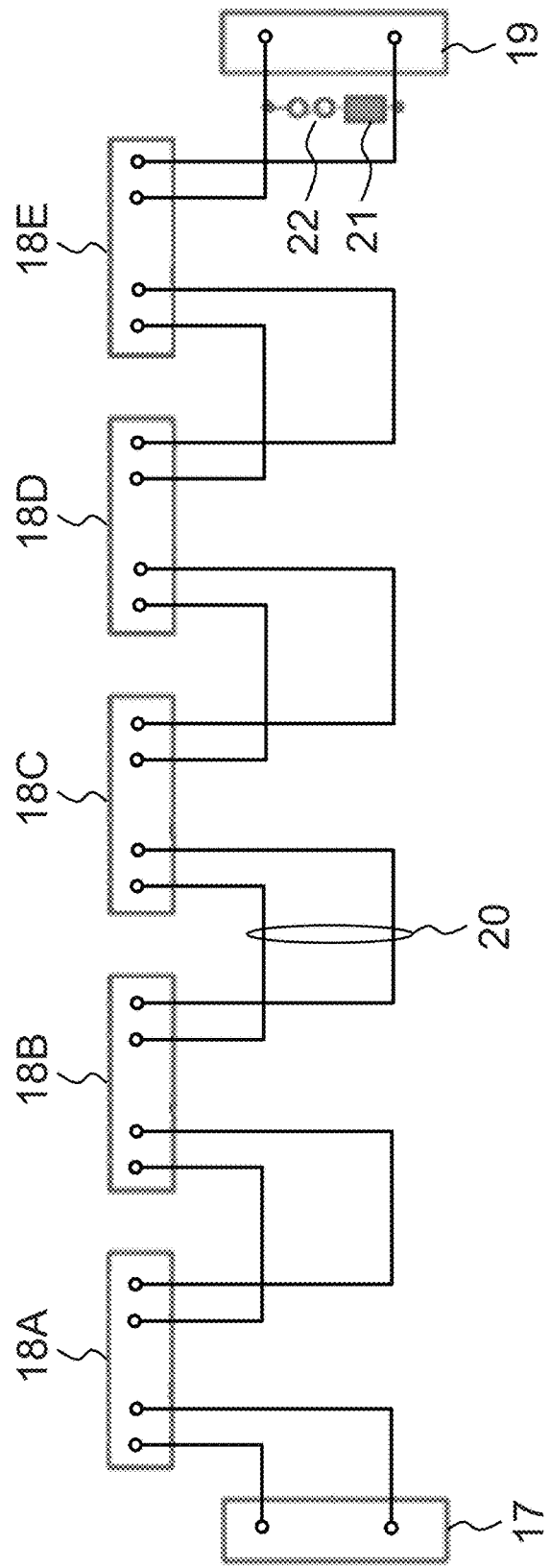
FIG. 4 is a drawing illustrating the configuration of the hub apparatus in the control system relating to the first example embodiment.

FIG. 4 is a drawing illustrating a configuration example of a hub apparatus relating to an example embodiment. In FIG. 4, the hub apparatus 10 comprises a first port 17 that receives predetermined, cascade-supplied differential signals (for instance differential signals compliant with RS (Recommended Standard)-485); a plurality of second ports 18A to 18E that receive and output the predetermined differential signals; a third port 19 that cascade-outputs the predetermined differential signals; a plurality of differential signal line pairs 20 that daisy-chain connect the first port 17, the plurality of second ports 18A to 18E, and the third port 19 in this order from upstream to downstream; and a terminator 21 provided between two differential signal lines that constitute a differential signal line pair 20 connecting the last-stage second port 18E out of the plurality of second ports 18A to 18E to the third port 19.

Figure 2:
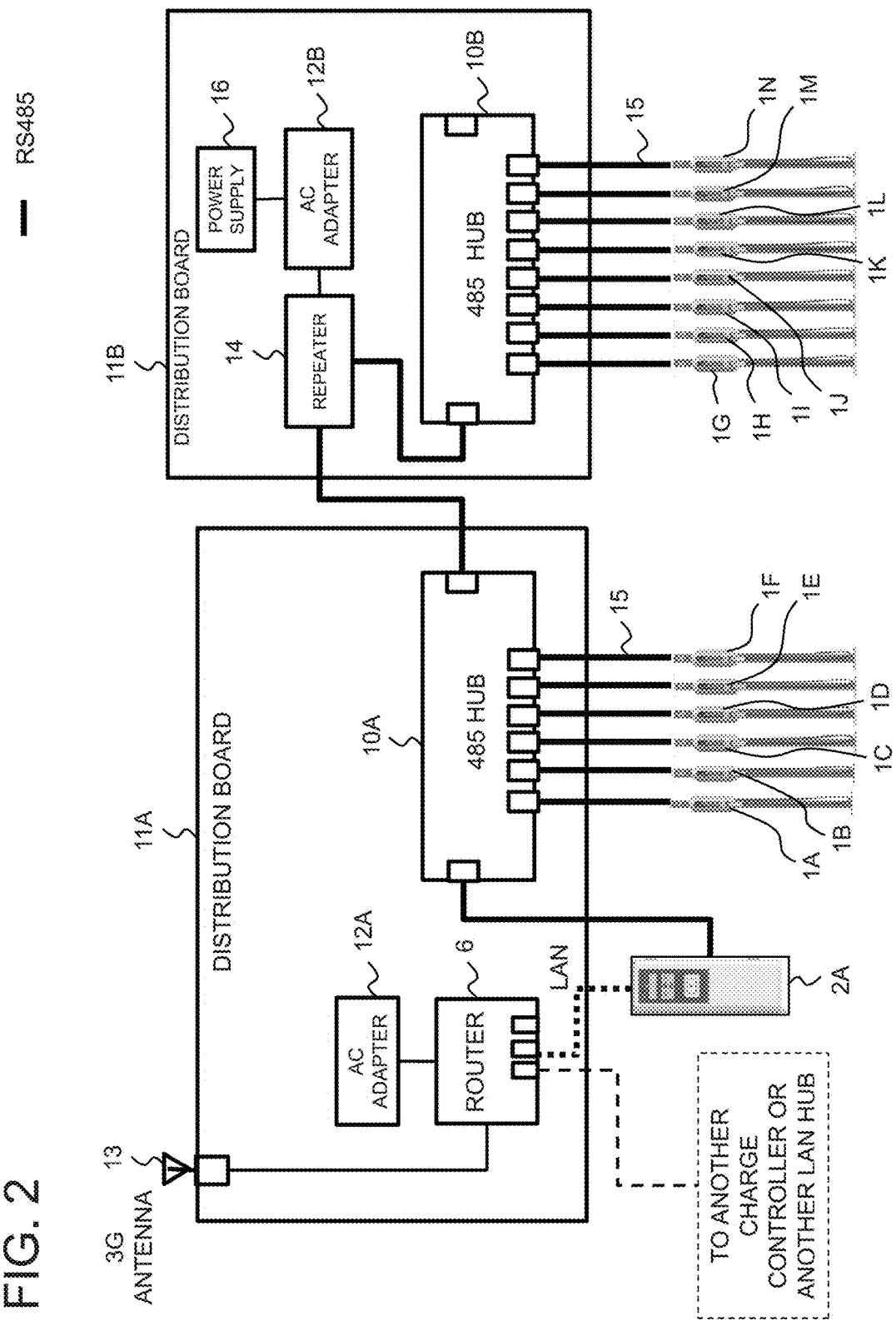
FIG. 2 is a drawing illustrating a detailed configuration of the control system relating to the first example embodiment.
Figure 3:
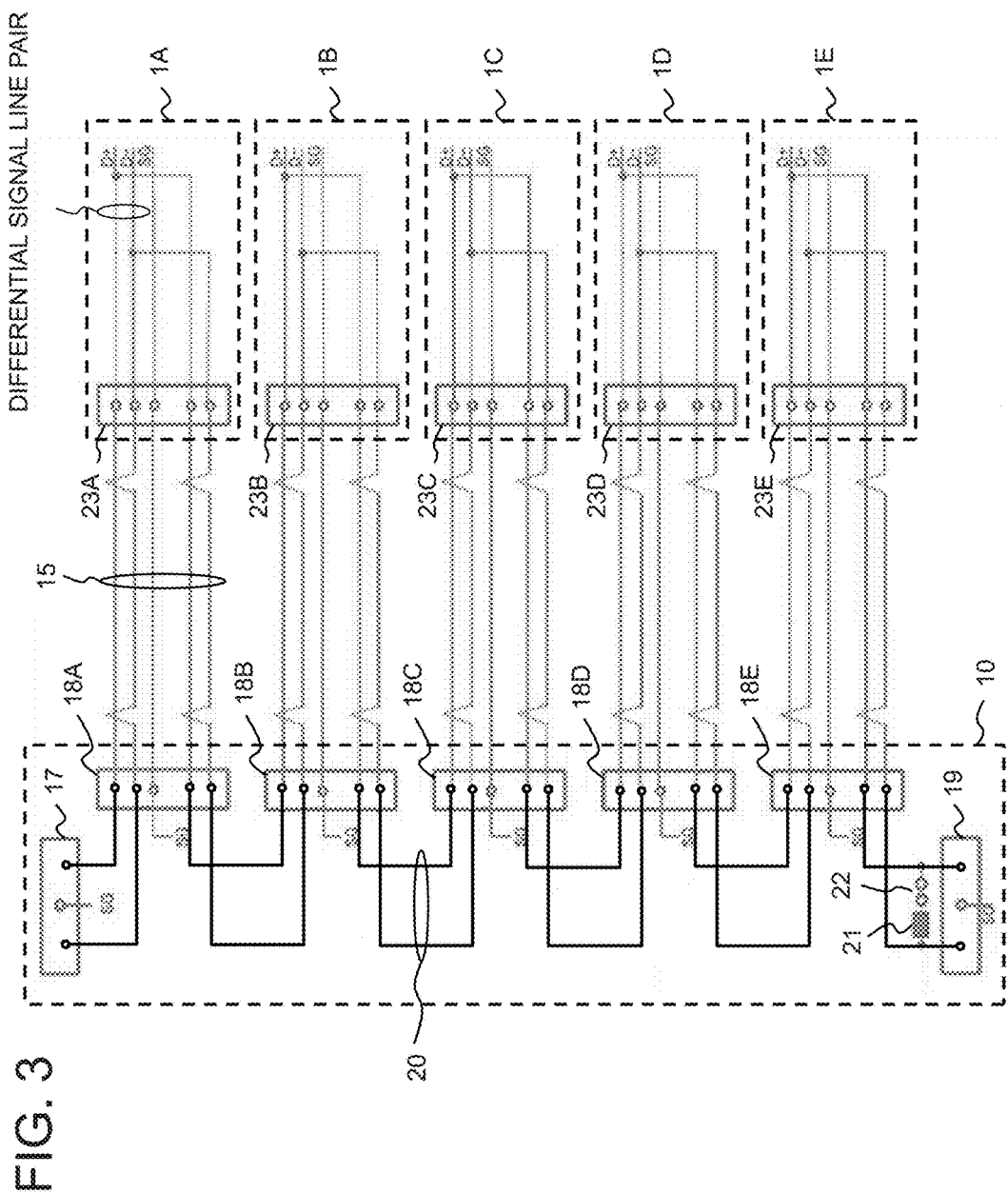
FIG. 3 is a drawing illustrating the configuration of a hub apparatus and chargers in the control system relating to the first example embodiment.

FIG. 3 is a drawing illustrating a configuration when a charge controller (not shown in the drawing) and a plurality of chargers 1A to 1E are daisy-chain connected using the hub apparatus 10 shown in FIG. 4. In FIG. 3, the first port 17 of the hub apparatus 10 is connected to the charge controller 2A (refer to FIG. 2). Each of ports 23A to 23E of the chargers 1A to 1E is connected to the corresponding second port of the hub apparatus 10 via a LAN (Local Area Network) cable 15.

According to the configuration shown in FIG. 3, it becomes possible to have a star wiring topology of the LAN cables 15 while daisy-chain connecting the hub apparatus 10 and the chargers 1A to 1E. Therefore, for instance, by providing a hub apparatus 10A in a distribution board 11A as shown in FIG. 2, power cables supplying power from the distribution board 11 to chargers 1A to 1F and signal cables (for instance the LAN cables 15) supplying control signals from the controller 2A to the chargers 1A to 1F can have a common topology. Further, with reference to FIG. 3, since the terminator 21 is provided in the hub apparatus 10, it is not necessary to provide built-in terminators in the chargers 1A to 1E, eliminating the need to set ON/OFF of terminators in the chargers 1A to 1E. As a result, according to the hub apparatus 10, it becomes possible to increase the flexibility of wiring and facilitate the setting of a terminator when a controller and a plurality of devices are daisy-chain connected.

In FIG. 3, the hub apparatus 10 may further comprise a first switch 22 that connects and disconnects between one of the two differential signal lines and the terminator 21.

According to the hub apparatus 10, it becomes possible to connect numerous devices (for instance chargers) by cascade-connecting a plurality of the hub apparatuses 10A and 10B as shown in FIG. 2, disconnecting the terminator 21 in the front hub apparatus 10A, and connecting the terminator in the rear hub apparatus 10B.

Figure 7:
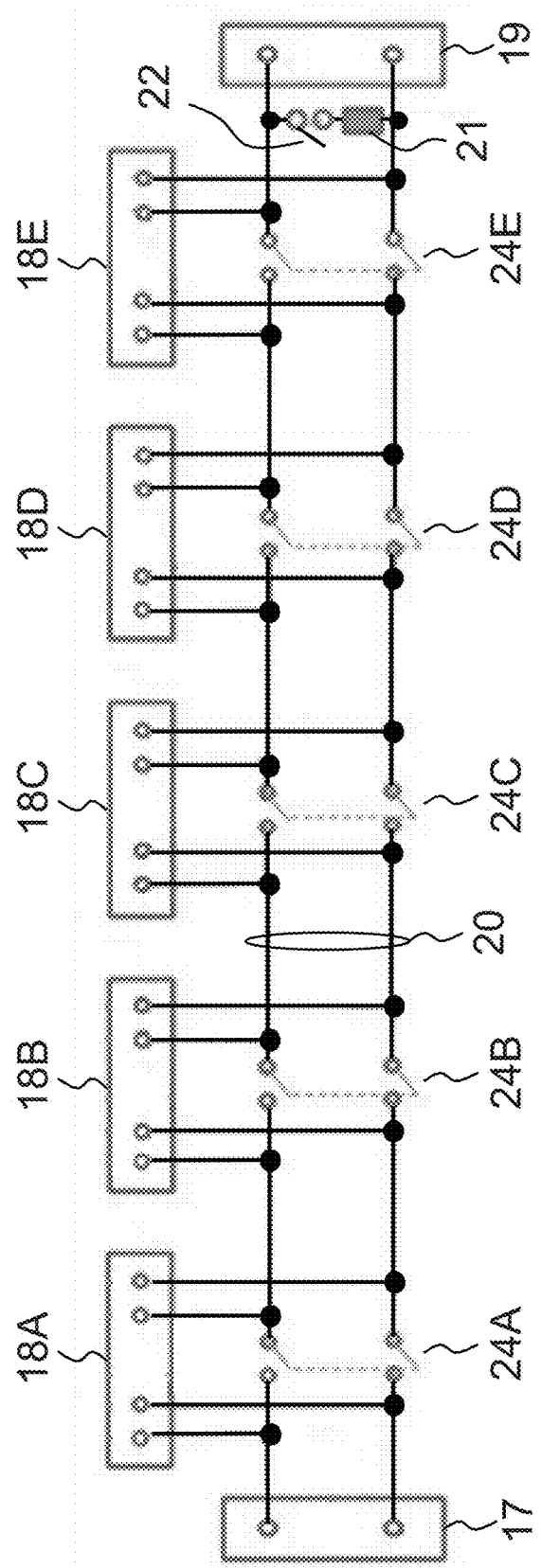
FIG. 7 is a drawing illustrating the configuration of the hub apparatus in the control system relating to the second example embodiment.

FIG. 7 is a drawing illustrating another configuration of the hub apparatus relating to an example embodiment. In FIG. 7, the hub apparatus 10 further comprises a plurality of second switches 24A to 24E that switch-over, between connected and disconnected states, between the differential signal line pairs before and after a corresponding second port out of the plurality of second ports 18A to 18E. For instance, the second switch 24B switches-over, between connected and disconnected states, between the differential signal line pairs before and after the corresponding second port 18B (i.e., the two pairs of differential signal lines that connect the second ports 18A and 18C, the ports before and after the second port 18B).

Figure 6:
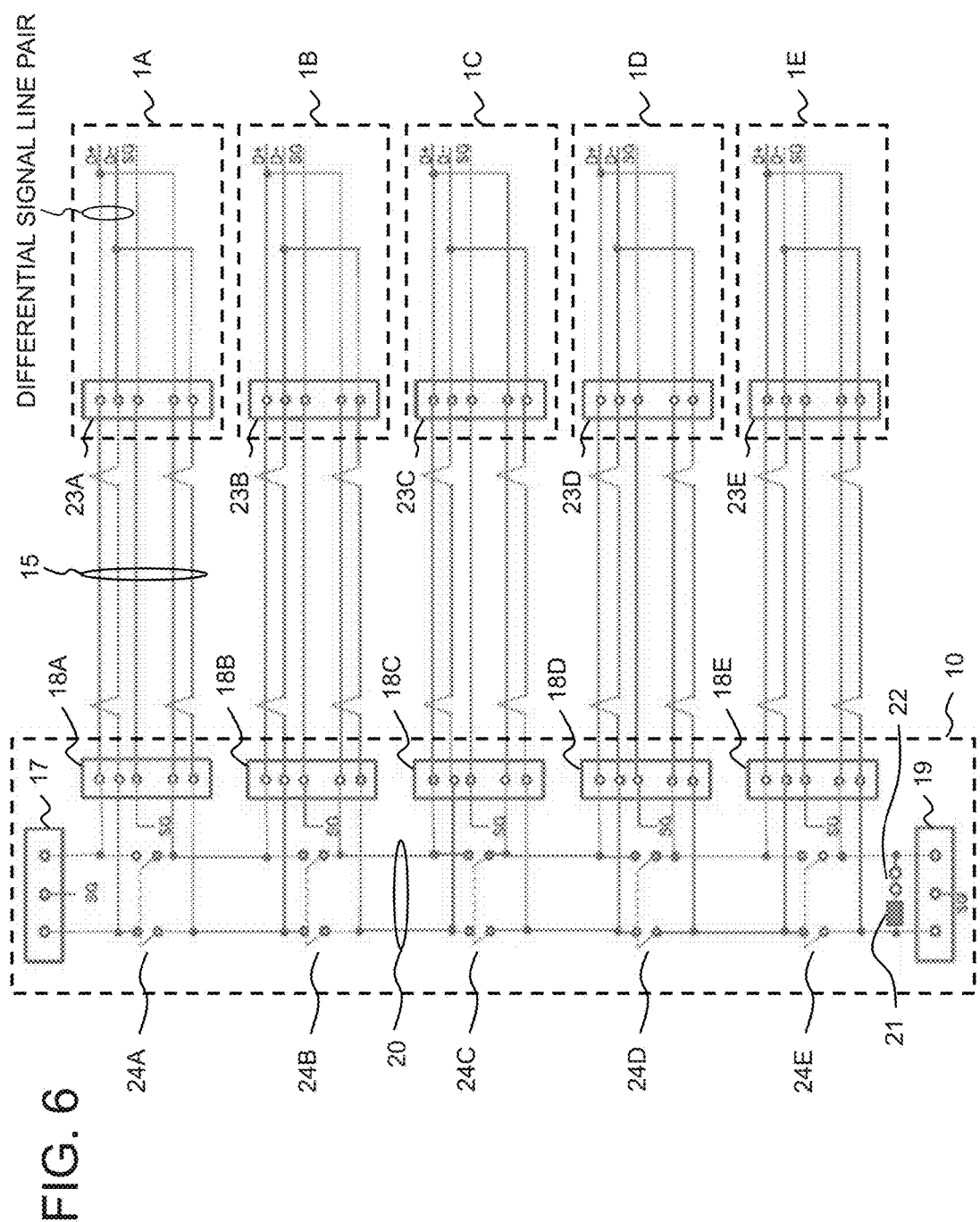
FIG. 6 is a drawing illustrating the configuration of a hub apparatus and chargers in a control system relating to a second example embodiment.

FIG. 6 is a drawing illustrating a configuration when a controller (not shown in the drawing) and a plurality of the chargers 1A to 1E are daisy-chain connected using the hub apparatus 10 shown in FIG. 7. In FIG. 6, the first port 17 of the hub apparatus 10 is connected to the controller. Each of the ports 23A to 23E of the chargers 1A to 1E is connected to the corresponding second port of the hub apparatus 10 via the LAN cable 15.

The configuration shown in FIG. 6 eliminates the need to change the connection configuration of the signal cables in a case where some of the plurality of the daisy-chain connected devices (for instance the plurality of chargers 1A to 1E) controlled by the controller are removed. For instance, if the charger 1B is removed in FIG. 6, the second switch 24B corresponding to the second port 18B, to which the charger 1B was connected, will just have to be switched to a connected state in the hub apparatus 10. In other words, if the charger 1B is removed in the related technology shown in FIG. 9, it will not be necessary to change the topology of the signal cable 4 to connect the chargers 1A and 1C using the signal cable 4.

Example Embodiment 1

Next, a control system relating to a first example embodiment will be described with reference to the drawings. FIG. 1 is a drawing illustrating a configuration of charging facilities comprising the control system of the present example embodiment. FIG. 1 shows a case where a charger is provided for each parking space in a large-scale parking lot. In FIG. 1, the charging facilities comprise charge controllers 2A to 2G, hub apparatuses (for instance 485 hubs compliant with RS-485) 10A to 10N, a router 6, and LAN hub apparatuses 9A to 9C.

Figure 9:
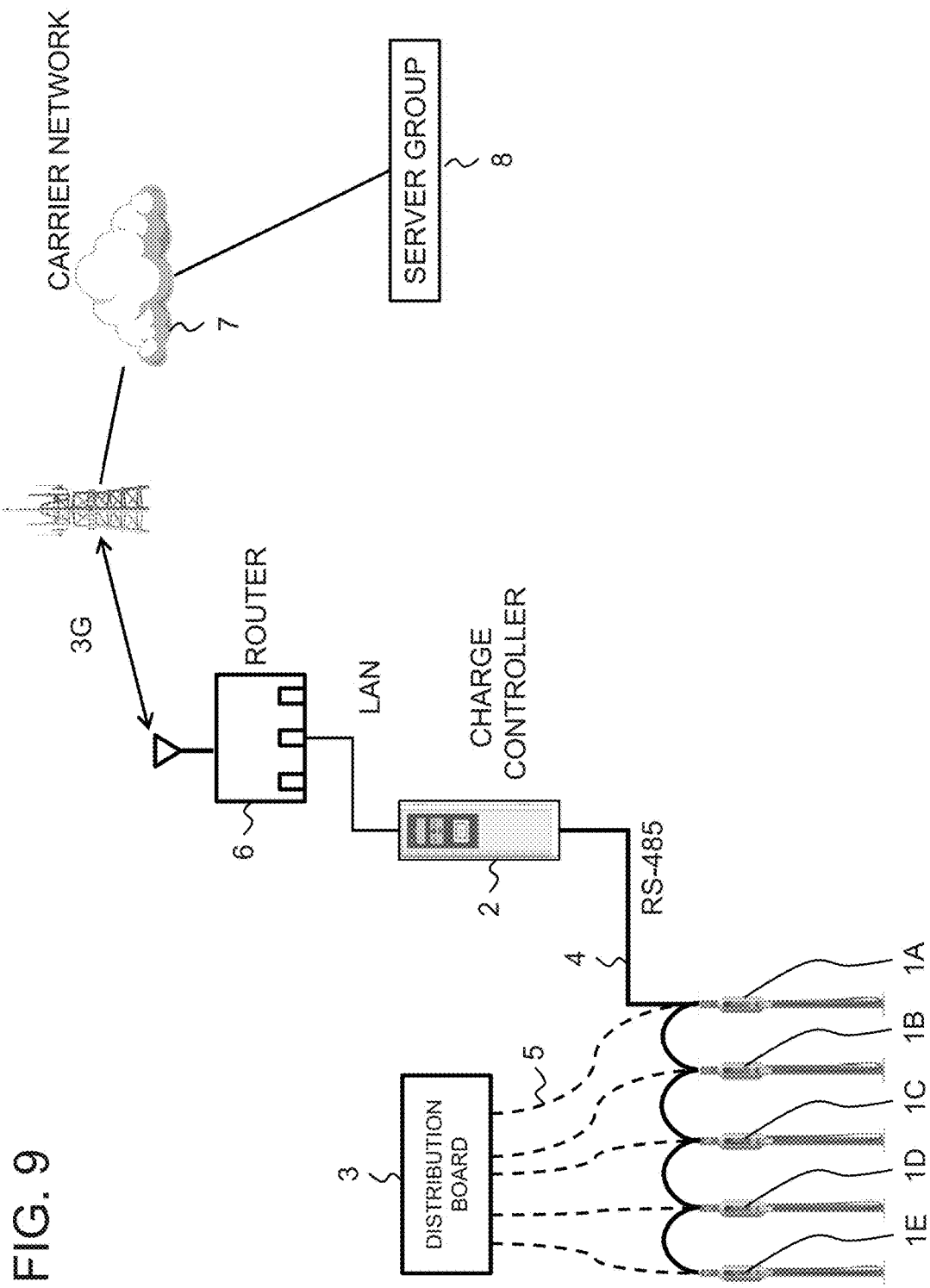
FIG. 9 is a drawing showing the configuration of charging facilities relating to a related technology.

The charge controllers 2A to 2G are connected via the router 6 and the LAN hub apparatuses 9A to 9C. The charge controllers 2A to 2G may also be connected to the server group 8 constituted by various servers via the router 6 and the carrier network 7, as shown in FIG. 9. The hub apparatuses 10A to 10N are cascade-connected to the corresponding charge controllers. For instance, in FIG. 1, the hub apparatuses 10A and 10B are cascade-connected to the charge controller 2A. Further, the number indicated in parentheses for each hub apparatus denotes the number of chargers connected to each hub apparatus. For instance, six chargers are connected to the hub apparatus 10A. In the configuration shown in FIG. 1, a total of 125 chargers are provided in the charging facilities.

FIG. 2 is a drawing illustrating a detailed configuration of the router 6, the charge controller 2A, and the hub apparatuses 10A and 10B in FIG. 1. In FIG. 2, the router 6 and the hub apparatus 10A are provided in the distribution board 11A whereas the hub apparatus 10B is provided in a distribution board 11B. The distribution board 11A further comprises an AC adapter 12A and a 3G (3rd Generation) antenna 13. The distribution board 11B further comprises a repeater 14, an AC adapter 12B, and a power supply 16.

The router 6 is connected to the server group 8 via the 3G antenna 13 and carrier network 7, as in an example shown in FIG. 9. The AC adapter 12A supplies power to the router 6. The router 6 and the charge controller 2A is connected by a LAN. The hub apparatus 10A is connected to the charge controller 2A via a cable capable of transmitting differential signals compliant with RS-485 (simply referred to as "signal cable" hereinafter). Chargers 1A to 1F are connected to ports provided in the hub apparatus 10A via signal cables (for instance the LAN cable 15).

The hub apparatus 10B is cascade-connected to the hub apparatus 10A via the repeater 14. The repeater 14 is connected to the hub apparatuses 10A and 10B via signal cables. The repeater 14 amplifies and shapes differential signals received from the output port of the hub apparatus 10A and outputs the result to the hub apparatus 10B. The AC (Alternating Current) adapter 12B converts the power supplied by the power supply 16 and supplies the converted power to the repeater 14. Chargers 1G to 1N are connected to ports provided in the hub apparatus 10B via signal cables (the LAN cable 15).

The charge controller 2A generates control signals (for instance predetermined differential signals compliant with RS-485) corresponding to operation received from a user and transmits the generated control signals to the chargers 1A to 1N via the cascade-connected hub apparatuses 10A and 10B. Further, the charge controller 2A is connected to the other charge controllers 2A via the router 6 or the LAN hub apparatuses 9A to 9C as shown in FIG. 1, and is able to send control signals to chargers under the other charge controllers. For instance, in the configuration of FIG. 1, the charge controller 2A is able to control a charger connected to the hub apparatus 10N by forwarding control signals to the charge controller 2G. As a result, the user is able to remotely charge an electric vehicle (EV) or plug-in hybrid vehicle (PHV) parked in a far distant parking space in a large parking lot.

FIG. 3 is a drawing illustrating a detailed configuration of the hub apparatus 10 and the chargers 1A to 1E (the hub apparatuses 10A and 10B are collectively referred to as the hub apparatus 10 since they have the same configuration). Here, in order to simplify the drawing, the number of ports (the second ports) in the hub apparatus 10 for connecting devices is five. FIG. 4 is a drawing showing the configuration of the hub apparatus 10 shown in FIG. 3.

Referring to FIG. 4, the hub apparatus 10 comprises the first port 17, the second ports 18A to 18E, the third port 19, the differential signal line pairs 20, the terminator 21, and the first switch 22. The first port 17 receives the cascade-supplied predetermined differential signals compliant with RS-485 from the charge controller 2A or a hub apparatus at a previous stage. The second ports 18A to 18E receive/ output the predetermined differential signals from/to connected devices. The third port 19 cascade-outputs the predetermined differential signals to the hub apparatus(es) at a subsequent stage(s). The differential signal line pairs 20 daisy-chain connect the first port 17, the plurality of second ports 18A to 18E, and the third port 19. The terminator 21 is provided between differential signal lines that constitute a differential signal line pair 20 connecting the second port 18E at the end of the daisy-chain connection to the third port 19. The first switch 22 switches-over between connected and disconnected states, between the terminator 21 and one of the two differential signal lines.

The first port 17 shown in FIG. 3 is connected to the charge controller 2A in the hub apparatus 10A in FIG. 2. Further, in the hub apparatus 10A, the terminator 21 is disconnected from the differential signal line pair 20 by the first switch 22 shown in FIG. 3. Meanwhile, in the hub apparatus 10B in FIG. 2, the first port 17 shown in FIG. 3 is connected to the third port of the hub apparatus 10A via the repeater 14. Further, in the hub apparatus 10B in FIG. 2, the terminator 21 is connected to the differential signal line pair 20 by the first switch 22 shown in FIG. 3. Each of the ports 23A to 23E of the chargers 1A to 1E is connected to the corresponding second port of the hub apparatus 10 via the LAN cable 15. For instance, the port 23A of the charger 1A is connected to the second port 18A of the hub apparatus 10 via the LAN cable 15.

The LAN cable 15 includes at least two differential signal line pairs capable of transmitting differential signals compliant with RS-485. Differential signals supplied to the port 23A of the charger 1A from the second port 18A of the hub apparatus 10A via the LAN cable 15 are supplied back to the second port 18A of the charger 1A [the hub apparatus 10A?] from the port 23A of the charger 1A via the LAN cable 15.

According to the configuration shown in FIG. 3, it becomes possible to have a star wiring topology of the LAN cables 15 while daisy-chain connecting the hub apparatus 10 and the chargers 1A to 1E. Therefore, for instance, by providing the hub apparatuses 10A and 10B in the distribution boards 11A and 11B as shown in FIG. 2, a power cable (not shown in the drawings) supplying power from the distribution board 11A to the chargers 1A to 1F, a power cable (not shown in the drawings) supplying power from the distribution board 11B to the chargers 1G to 1N, and the LAN cables 15 supplying control signals from the controller 2A to the chargers 1A to 1N all can have a star topology. As a result, according to the hub apparatus 10, it becomes possible to increase the flexibility of wiring when the charge controller 2 and the plurality of chargers 1 are daisy-chain connected.

Further, with reference to FIG. 3, since the terminator 21 is provided in the hub apparatus 10, it is not necessary to provide built-in terminators in the chargers 1A to 1E, eliminating the need to set ON/OFF of terminators in the chargers 1A to 1E. In other words, according to the hub apparatus 10, it becomes possible to facilitate the setting of the terminator and reduce the manufacturing cost of the charger 1.

Further, when the first switch 22 that switches-over, between connected and disconnected states, between the terminator 21 and one of the differential signal line pair is provided in the hub apparatus 10 and a plurality of the hub apparatuses 10A and 10B are cascade-connected, it becomes possible to connect numerous chargers 1 by disconnecting the terminator 21 in the hub apparatus 10A of a preceding stage and connecting the terminator in the hub apparatus 10B of a subsequent stage. According to the hub apparatus 10, it becomes possible to install numerous chargers 1 in each parking space in a plurality of areas in a large-scale parking lot, improving the convenience for drivers of EVs and PHVs.

Further, according to the hub apparatus 10, it becomes possible to reduce the effect of noise on differential signals. This will be explained using a comparative example.

Figure 5:
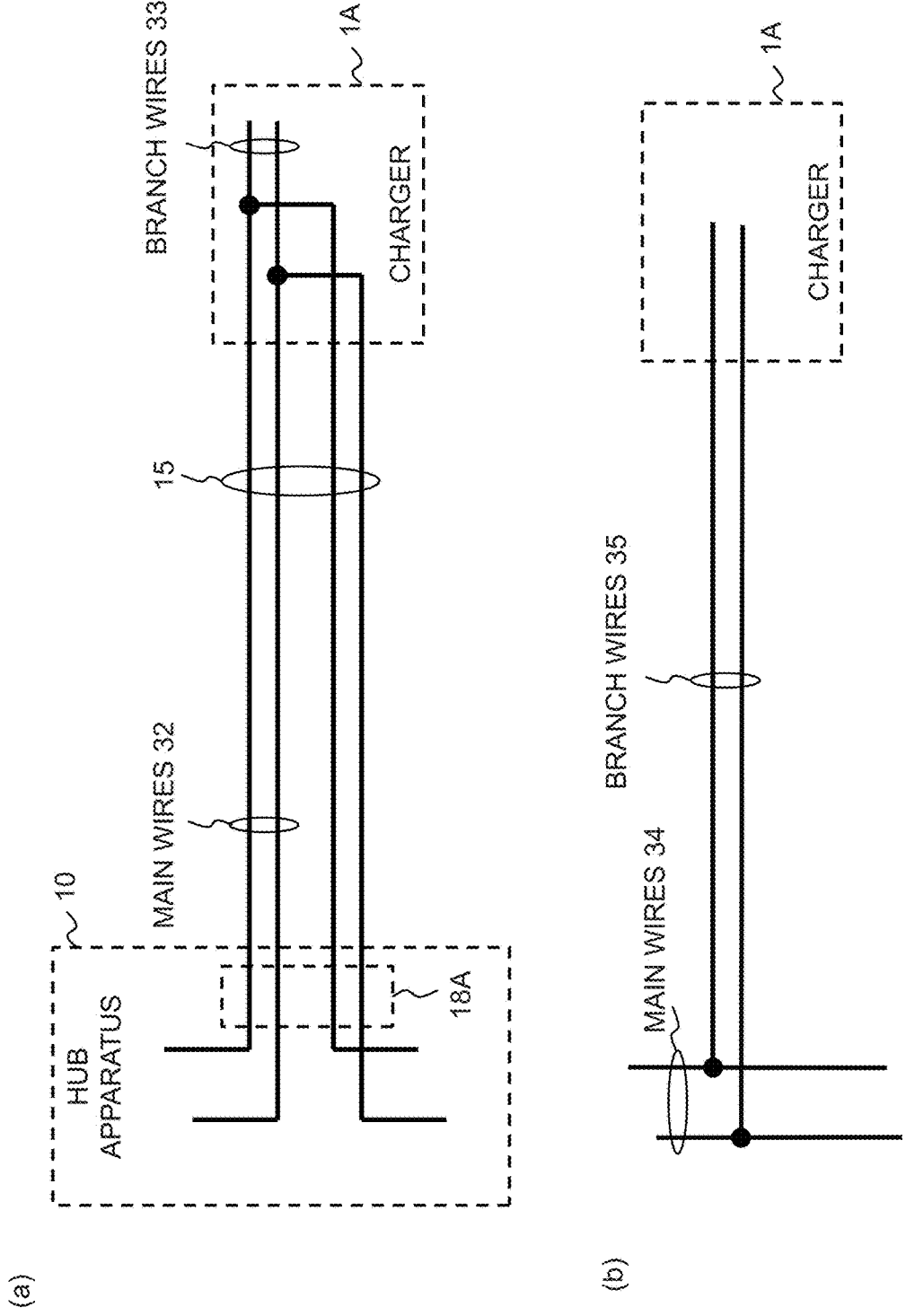
FIGS. 5(a) and 5(b) are drawings for explaining the effects of the hub apparatus in the control system relating to the first example embodiment.

FIG. 5(a) is a drawing schematically showing the configuration of signal lines that transmit differential signals when the hub apparatus 10 in the present example embodiment is used. In FIG. 5(a), it is possible to have a round-trip connection of main wires 32 of the signal lines reach the charger 1A using the LAN cables 15. Therefore, according to the hub apparatus 10, it becomes possible to keep the length of branch wires 33, branched from the main wires 32, relatively short, and reduce the effect of noise on differential signals.

Note that the "main wire (or line)" is also referred to as "master," "transmission circuit (transmission line)", or "data transmission circuit (data transmission line)" and denotes a standards-compliant stable circuit such as with matched impedance etc. Meanwhile, the "branch wire (or line)" is also referred to as "branch" or "bridge tap" and denotes an extra wire outside the regular (main) wiring system that could disturb the signal on the main wire.

FIG. 5(b) is a drawing showing the configuration of signal lines relating to a comparative example. As shown in FIG. 5(b), if branch wires 35 are simply branched from main wires 34 destined to the charger 1A, the branch wires 35 will be longer, compared with the case in FIG. 5(a), and the effect of noise on differential signals flowing on the main wires 34 will be significant.

Example Embodiment 2

Next, a control system relating to a second example embodiment will be described with reference to the drawings. The control system of the present example embodiment differs from the control system relating to the first example embodiment in the configuration of the hub apparatus 10. The differences between the present example embodiment and the first example embodiment will be mainly described below.

FIG. 6 is a drawing illustrating a configuration when a charge controller (not shown in FIG. 6) and a plurality of the chargers 1A to 1E are daisy-chain connected using the hub apparatus 10 of the present example embodiment. In FIG. 6, the first port 17 of the hub apparatus 10 is connected to the charge controller 2A (refer to FIG. 2). Each of the ports 23A to 23E of the chargers 1A to 1E is connected to the corresponding second port via the LAN cable 15.

FIG. 7 is a drawing illustrating the configuration of the hub apparatus 10 in the present example embodiment. With reference to FIG. 7, the hub apparatus 10 further comprises a plurality of second switches 24A to 24E that switch-over, between connected and disconnected states, two differential signal line pairs 20 daisy-chain connecting a corresponding second port out of the plurality of second ports 18A to 18E in the hub apparatus 10 of the first example embodiment (refer to FIG. 4). For instance, the second switch 24B switches-over, connected and disconnected states, the two differential signal line pairs 20 that daisy-chain connect the corresponding second port 18B (i.e., the two differential signal line pairs 20 that daisy-chain connect the second port 18B to the second ports 18A and 18C, the ports before and after the second port 18B).

The configuration shown in FIG. 6 eliminates the need to reconnect the signal cables in a case where some of the plurality of the daisy-chain connected chargers 1A to 1E controlled by the controller 2A are removed. For instance, if the charger 1B is removed in FIG. 6, the second switch 24B corresponding to the second port 18B, to which the charger 1B was connected, will just have to be switched-over to a connected state from a disconnected state in the hub apparatus 10. In other words, if the charger 1B is removed in the related technology shown in FIG. 9, it will not be necessary to change the connection of the signal cable 4 to directly reconnect the chargers 1A and 1C using the signal cable 4. Similarly, for instance, if the charger 1B is connected to an available second port 18B in FIG. 6, the second switch 24B corresponding to the second port 18B will just have to be switched-over from a connected state to a disconnected state in the hub apparatus 10.

As a result, according to the hub apparatus 10 in the present example embodiment, installing and removing a charger connected to be controlled by the charge controller 2A is facilitated, compared with the related technology (FIG. 9).

Further, according to the hub apparatus 10 of the present example embodiment, any number of devices (for instance chargers) can be connected to the hub apparatus 10. Therefore, according to the hub apparatus 10 of the present example embodiment, the same hub apparatus (for instance a hub apparatus having ten second ports 18) can be used as the hub apparatuses 10A to 10N in the configuration shown in FIG. 1.

Example Embodiment 3

Next, a control system relating to a third example embodiment will be described with reference to the drawings. In the control system of the present example embodiment, a home appliances controller uniformly controls home appliances (for instance air conditioner, television, lighting apparatus, rice cooker, microwave oven, water heater, wash machine, etc.) to which an information and communication technology (ICT) is applied. Here, as an example, a case using the hub apparatus (FIG. 7) relating to the second example embodiment will be described.

Figure 8:
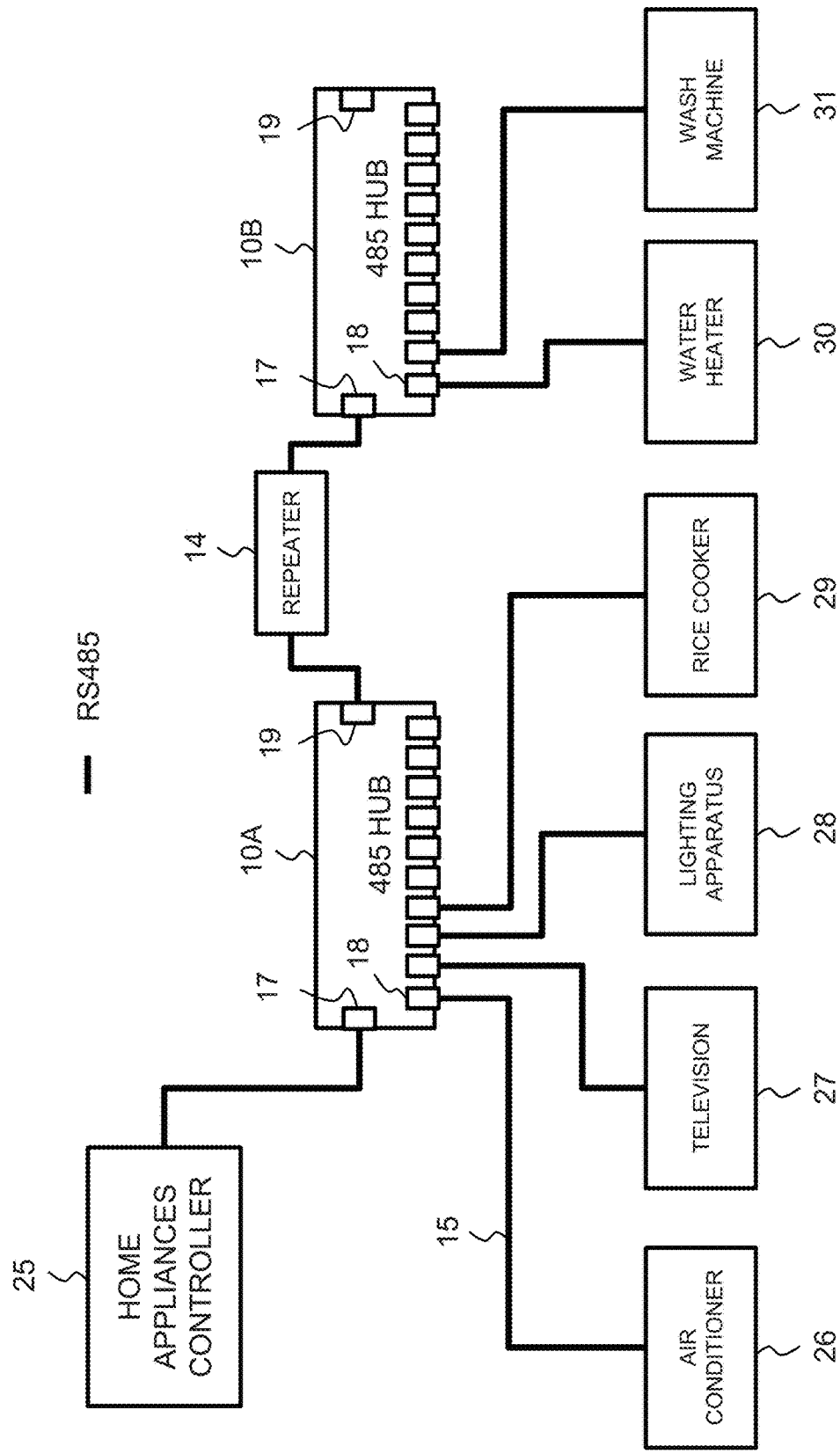
FIG. 8 is a drawing illustrating the configuration of a control system relating to a third example embodiment.

FIG. 8 is a drawing illustrating a configuration of the control system relating to the present example embodiment. In FIG. 8, the control system comprises a home appliances controller 25, the hub apparatuses (for instance 485 hubs compliant with RS-485) 10A and 10B, and the repeater 14. FIG. 8 shows a single home appliances controller 25 and the two hub apparatuses 10A and 10B, however, the numbers of home appliances controllers and hub apparatuses and the connection configuration thereof are not limited to the mode shown in the drawing.

The hub apparatus 10A is connected to the home appliances controller 25. Here, the hub apparatus 10A is connected to the home appliances controller 25 via a cable capable of transmitting differential signals compliant with RS-485 (simply referred to as "signal cable" hereinafter). Meanwhile, the hub apparatus 10B is cascade-connected to the hub apparatus 10A via the repeater 14. The repeater 14 is connected to the hub apparatuses 10A and 10B via the signal cables. The repeater 14 amplifies and shapes differential signals received from the output port of the hub apparatus 10A and outputs the result to the hub apparatus 10B.

An air conditioner 26, a television 27, a lighting apparatus 28, and a rice cooker 29 are connected to the ports provided in the hub apparatus 10A via the signal cables (for instance the LAN cables 15). Similarly, a water heater 30 and a wash machine 31 are connected to the ports provided in the hub apparatus 10B via the signal cables (for instance the LAN cables 15).

Each of the hub apparatuses 10A and 10B is the hub apparatus 10 relating to the second example embodiment (refer to FIGS. 6 and 7).

In the hub apparatus 10A in FIG. 8, the first port 17 (refer to FIG. 7) is connected to the home appliances controller 25. Further, in the hub apparatus 10A in FIG. 8, the terminator 21 is disconnected from the differential signal line pair 20 by the first switch 22 (refer to FIG. 7). Meanwhile, in the hub apparatus 10B in FIG. 8, the first port 17 (refer to FIG. 7) is connected to the third port of the hub apparatus 10A via the repeater 14. Further, the terminator 21 in the hub apparatus 10B in FIG. 8 is connected to the differential signal line pair 20 by the first switch 22 (refer to FIG. 7).

Further, in the hub apparatus 10A in FIG. 8, the second switches 24 corresponding to the second ports 18 connected to the air conditioner 26, the television 27, the lighting apparatus 28, and the rice cooker 29 are in a disconnected state (OFF), and the second switches 24 corresponding to the other second ports 18 are in a connected state (ON) (refer to FIG. 7). Similarly, in the hub apparatus 10B in FIG. 8, the second switches 24 corresponding to the second ports 18 connected to the water heater 30 and the wash machine 31 are in the disconnected state (OFF), and the second switches 24 corresponding to the other second ports 18 are in the connected state (ON) (refer to FIG. 7).

The home appliances controller 25 generates control signals (for instance predetermined differential signals compliant with RS-485) corresponding to operation received from a user and transmits the generated control signals to the home appliances (the air conditioner 26, the television 27, the lighting apparatus 28, the rice cooker 29, the water heater 30, and the wash machine 31) via the cascade-connected hub apparatuses 10A and 10B. As a result, the user is able to remotely operate various home appliances using the home appliances controller 25. For instance, the user is able to set the timer of the rice cooker 29 in the kitchen or set the water temperature of the water heater 30 in the bathroom using the home appliances controller located in the living room.

According to the configuration shown in FIG. 8, it becomes possible to have a star wiring topology of the LAN cables 15 while daisy-chain connecting the home appliances controller 25 and a plurality of home appliances via the hub apparatuses 10A and 10B. If the home appliances controller 25 and the plurality of home appliances are directly daisy-chain connected to each other, it will be difficult to secure space for arranging signal lines that sequentially connect the home appliances. According to the hub apparatuses 10A and 10B in the present example embodiment, however, the hub apparatuses 10 and the home appliances can be star-connected, facilitating the wiring.

Further, since the terminators 21 are provided in the hub apparatuses 10A and 10B, it is not necessary to provide built-in terminators in the home appliances, eliminating the need to set ON/OFF of a terminator in each home appliance. As a result, according to the hub apparatuses 10A and 10B, it becomes possible to facilitate the setting of terminators and reduce the manufacturing cost of home appliances.

Further, when the first switch 22 that changes-over, between connected and disconnected states, between the terminator 21 and one of the differential signal line pair is provided in the hub apparatus 10 and a plurality of the hub apparatuses 10A and 10B are cascade-connected, it becomes possible to secure a large number of ports for connecting home appliances by disconnecting the terminator 21 in the front hub apparatus 10A and connecting the terminator in the rear hub apparatus 10B.

Further, as explained in the first example embodiment, according to the hub apparatuses 10A and 10B, it becomes possible to reduce the effect of noise on differential signals.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as any numeric value or small range example included in these ranges even in cases where no explicit mention is provided.

1, 1A to 1N: charger
2, 2A to 2G: charge controller
3: distribution board
4: signal cable
5: power cable
6: router
7: carrier network
8: server group
9A to 9C: LAN hub apparatus
10, 10A to 10N: hub apparatus
11A, 11B: distribution board
12A, 12B: AC adapter
13: 3G antenna
14: repeater
15: LAN cable
16: power supply
17: first port
18A to 18E: second port
19: third port
20: differential signal line pair
21: terminator
22: first switch
23A to 23E: port
24A to 24E: second switch
25: home appliances controller
26: air conditioner
27: television
28: lighting apparatus
29: rice cooker
30: water heater
31: wash machine
32, 34: main wires
33, 35: branch wires

What is claimed is:

1. A hub apparatus, comprising:
a first port that receives predetermined cascade-supplied differential signals;
a plurality of second ports that receive and output the predetermined differential signals;
a third port that cascade-outputs the predetermined differential signals;
a plurality of differential signal line pairs that daisy-chain connect the first port, the plurality of second ports, and the third port in this order from upstream to downstream;
a terminator provided between two differential signal lines that constitute a differential signal line pair connecting the last-stage second port out of the plurality of second ports to the third port; and
a first switch that connects and disconnects between one of the two differential signal lines that constitute a differential signal line pair connecting the last-stage second port out of the plurality of second ports to the third port and the terminator.

2. The hub apparatus according to claim 1, comprising a plurality of second switches that change-over, between connected and disconnected states, between the differential signal line pairs before and after a corresponding second port out of the plurality of second ports.

3. A control system, comprising:
a first hub apparatus;
a second hub apparatus cascade-connected to the first hub apparatus; and
the first and the second hub apparatuses comprising:
a first port that receives predetermined cascade-supplied differential signals;
a plurality of second ports that receive and output the predetermined differential signals;
a third port that cascade-outputs the predetermined differential signals;
a plurality of differential signal line pairs that daisy-chain connect the first port, the plurality of second ports, and the third port in this order from upstream to downstream;
a terminator provided between two differential signal lines that constitute a differential signal line pair connecting the last-stage second port out of the plurality of second ports to the third port; and
a first switch that connects and disconnects between one of the two differential signal lines and the terminator, wherein
the first port of the second hub apparatus receives the predetermined differential signals outputted from the third port of the first hub apparatus.

4. The control system according to claim 3, wherein
the first and the second hub apparatuses comprise a plurality of second switches that switch-over, between connected and disconnected states, between the differential signal line pairs before and after a corresponding second port out of the plurality of second ports.

5. The control system according to claim 3, comprising a repeater connected between the third port of the first hub apparatus and the first port of the second hub apparatus, wherein
the repeater amplifies the predetermined differential signals outputted from the third port of the first hub apparatus and outputs the result to the first port of the second hub apparatus.

6. The control system according to claim 3, comprising:
a controller connected to the first port of the first hub apparatus;
a device connected to any of the plurality of second ports of the first or the second hub apparatus; and
the controller controlling the device via the first hub apparatus or the first and the second hub apparatuses.

7. The control system according to claim 6, wherein the device is a charger or home appliance.

8. The control system according to claim 4, comprising a repeater connected between the third port of the first hub apparatus and the first port of the second hub apparatus, wherein the repeater amplifies the predetermined differential signals outputted from the third port of the first hub apparatus and outputs the result to the first port of the second hub apparatus.

9. The control system according to claim 4, comprising:
a controller connected to the first port of the first hub apparatus;
a device connected to any of the plurality of second ports of the first or the second hub apparatus; and
the controller controlling the device via the first hub apparatus or the first and the second hub apparatuses.

10. The control system according to claim 5, comprising:
a controller connected to the first port of the first hub apparatus;
a device connected to any of the plurality of second ports of the first or the second hub apparatus; and
the controller controlling the device via the first hub apparatus or the first and the second hub apparatuses.

11. The control system according to claim 9, wherein the device is a charger or home appliance.

12. The control system according to claim 10, wherein the device is a charger or home appliance.

* * * * *